Patented Sept. 26, 1933

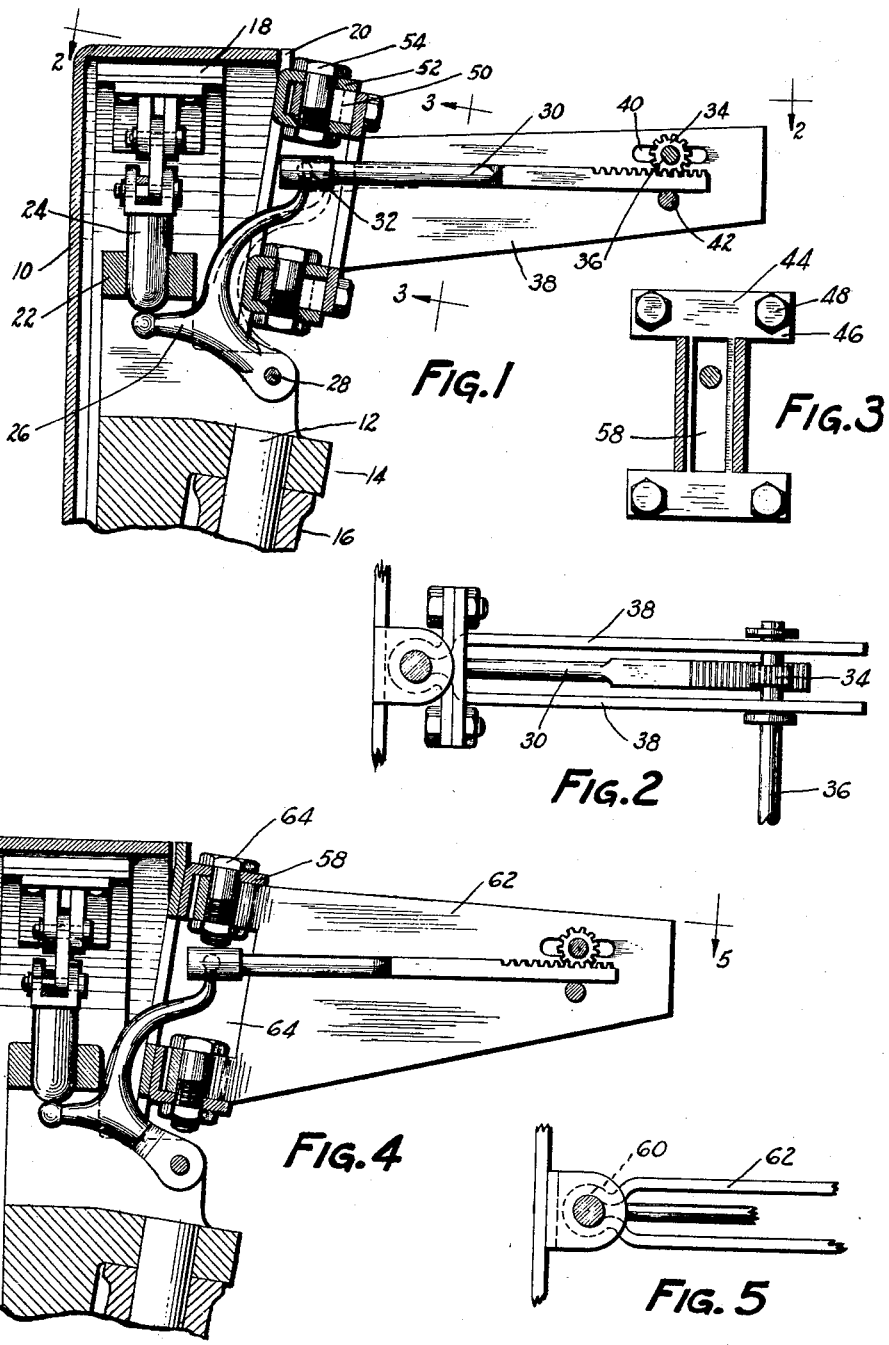

1,928,046

UNITED STATES PATENT OFFICE 1,928,046

BRAKE

Vincent Bendix, Chicago, Ill., assignor to Bendix Brake Company, South Bend, Ind., a corporation of Illinois Application December 13, 1928
Serial No. 325,741

15 Claims. (Cl. 188—194)

This invention relates to brakes and is illustrated as embodied in a front wheel automotive brake of the external expanding type.

An object of the invention is to provide an efficient rigid control structure for the brake on a swiveled wheel, which structure is supported entirely by the wheel and brake structure, being free from all connection to either the axle or forward chassis parts as is the usual custom.

A further feature of my novel control resides in the simplicity of the parts thereof wherein juxtaposed supports such as plates have a swiveling connection with the brake support. These supports are adapted to house between them a longitudinally movable shaft such as a rack, the latter to be actuated by an operating means such as a pinion which may be connected with the brake cross shaft adjacent the service pedal through the intermediary of suitable pull rods, linkage, etc., the connection between the cross shaft and linkage being a flexible one. I further prefer to arrange the connection between the control rack and its mating brake part in or immediately adjacent the swiveling axis of the wheel with the brake released. This arrangement taken with the swiveling movement of the rack supports completely compensates for movement incident to the steering of the vehicle and vertical chassis motion, leaving the control unaffected thereby.

Further minor but important features of my invention relate to the novel means for swiveling the control supports to the brake support wherein I may either provide separate stampings forming a part of a double hinge construction or provide tabs struck up from the stock of the brake support.

Other features of my invention including various novel and desirable details of construction and combinations of parts will be apparent from the following description of the illustrated embodiments shown in the accompanying drawing, in which:

Figure 1 is a partial vertical section through the brake indicating my novel rigid control structure and the support therefor;

Figure 2 is a partial plan view of the control mechanism looking in the direction of the arrows 2—2 of Figure 1;

Figure 3 is a section taken on the line 3—3 of Figure 1 indicating in more detail the support plates for the rigid control rod; and Figures 4 and 5 are views similar to Figures 1 and 2 indicating a modified form of hinged support plates.

In the embodiment disclosed in Figures 1, 2 and 3, the numeral 10 denotes the usual brake drum mounted on the front wheel of a vehicle (not shown). The wheel is positioned on the conventional spindle swiveled on a king pin 12 passing through the steering knuckle 14 and axle 16. The friction means 18 of the brake is supported by the usual backing plate 20. The steering knuckle 14 preferably supports a spider 22, the latter guiding a brake operating plunger 24 operated by a bell-crank lever 26 pivoted to a pin 28 supported by the spider.

According to an important feature of my invention, I prefer to actuate the bell-crank by a novel rigid transmission means which may comprise a rod 30 having a rack and universally connected at one end to the lever by a ball and socket joint 32. A pinion 34 is preferably arranged to give longitudinal movement to the rack meshing therewith and operated by a suitable shaft 36, which shaft is preferably connected to the service pedal by transmission linkage which is unaffected by the chassis movement relative thereto. In other words I propose to make my novel rigid operating means, including the rack and pinion, free of such connections with the sprung parts of the vehicle as would disturb its fixed relation to the brake operating bell-crank lever. As a further important feature of my invention, I suggest that the ball and socket connection 32 lie in the swiveling axis of the wheel in "brake off" position, thus obviating movement of the control parts when the wheel is swiveled with the consequent impediment to the steering of the vehicle which would ensue. The very small movement of the connection 32 with the brake applied and as the vehicle is being steered is compensated for by the play in the ball and socket.

As a further feature of my invention, I propose to provide a novel support for the rigid control comprising two spaced plates 38 slotted at 40 to accommodate the shaft 36 and housing the rack which is supported by a pin 42 seated in the plates. The support is maintained against movement relative to the chassis by a pair of stops secured to the shaft 36, one being positioned on the outside of the edge of the blades 38 and contacting with said blade. As shown in Figure 3 the plates 38 may be bent from a blank 44, leaving ears 46 suitably secured as by bolts 48 to fittings 50, the latter housed between tabs 52 struck out from the material of the backing plate. Bolts 54 complete the hinged joints permitting swiveling of the plates on the backing plate the axis of the said bolts lying in an indentation of the swiveling axis of the king pin 12. A recess 58 is provided in the blank to accommodate the bell-crank lever.

In the modification disclosed in Figures 4 and 5, separate angle iron fittings 58 secured to the backing plate serve as bearings for the return bent ends 60 of the spaced parallel plates 62, a recess being provided to permit movement of the bell-crank. Bolts 64 complete the hinged joint between the supports and the backing plate.

While I have described two modifications of my invention in detail, I do not wish to be unnecessarily limited thereto but only so far as may be defined by the scope of the appended claims.

I claim:

1. A brake structure comprising, in combination, a brake support, spaced plates hinged thereto and a brake control means housed within and supported by said plates.

2. A brake structure comprising, in combination, a swiveled support, a bracket pivotally supported thereby and a rigid brake control means housed within and supported by said pivoted bracket.

3. A brake structure comprising, in combination, an operating lever, a swiveled brake support, a bracket pivotally supported thereby and a rigid brake control means supported by said bracket and connected at its inner end to said lever.

4. A vehicle structure including a steering knuckle, a brake support plate mounted on said knuckle, a pair of spaced plates hingedly supported at one end by said plate, a bell crank operating lever mounted on said knuckle for swiveling movement therewith and a rigid operating element supported by said plates having a universal connection with said lever.

5. A brake structure comprising a plate having collinear struck out portions forming bearing members and a pair of spaced plates hinged to said bearing members.

6. A brake structure, comprising, a support plate having collinear members secured thereto, and a pair of spaced plates so connected to said members as to form a hinged joint.

7. A brake for a swiveled wheel having actuating means pivotally mounted on the brake, and a connection for operating said means arranged to hold said actuating means against turning when the wheel is swiveled.

8. A brake having a pivoted bracket extending therefrom, actuating means supported by the bracket, and means for holding the bracket from movement during movement of the brake.

9. A brake having a pivoted bracket extending therefrom, actuating means supported by the bracket, and operating connections arranged to hold the bracket from movement during movement of the brake.

10. Brake operating mechanism comprising a rotative shaft having a pinion, a rack operated by the pinion, and a pivotally supported bracket movably supporting the rack.

11. Brake operating mechanism comprising a rotative shaft having a pinion, a rack operated by the pinion, a pivotally supported bracket movably supporting the rack, and stops on the shaft limiting the movement of the bracket.

12. An automotive vehicle structure, comprising, in combination, a swiveled wheel, a brake structure associated therewith, a swiveling support for said brake structure, a bracket pivoted on the support, means comprising a rack member supported by said bracket for moving longitudinally to apply the brake, and means for flexibly connecting the rack member to the brake structure.

13. An automotive vehicle structure, comprising, in combination, a swiveled wheel, a brake structure associated therewith, a swiveled support for said brake structure, a bracket pivotally mounted on the swiveled support on an axis aligned with the swiveling axis of the wheel, a rigid member supported by said bracket having relative movement therewith and means for flexibly connecting the rigid member to the brake structure.

14. A brake structure comprising, in combination, a backing plate having brackets thereon, a support pivotally fastened to the brackets, and a control structure including a rack and pinion positioned on the support.

15. A brake for a swiveled wheel having a support pivotally mounted thereon, on an axis coincidental with that of the swivel axis of the wheel, and means for holding said support against turning when the wheel is swiveled.

VINCENT BENDIX.